(12) United States Patent
Kaitha

(10) Patent No.: US 11,416,224 B1
(45) Date of Patent: Aug. 16, 2022

(54) AUGMENTED INTELLIGENCE FOR CREATING SOFTWARE DEVELOPMENT ARTIFACTS

(71) Applicant: Capital One Services, LLC, McLean, VA (US)

(72) Inventor: Sunil Kaitha, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/189,326

(22) Filed: Mar. 2, 2021

(51) Int. Cl.
*G06F 8/40* (2018.01)
*G06F 8/35* (2018.01)
*G06N 3/04* (2006.01)
*G06N 3/08* (2006.01)

(52) U.S. Cl.
CPC .............. *G06F 8/35* (2013.01); *G06N 3/04* (2013.01); *G06N 3/08* (2013.01)

(58) Field of Classification Search
CPC ........................................................ G06F 8/40
See application file for complete search history.

(56) References Cited

U.S. PATENT DOCUMENTS

| | | | |
|---|---|---|---|
| 9,189,757 B2 | 11/2015 | Finlayson et al. | |
| 9,207,931 B2 | 12/2015 | Fox et al. | |
| 10,338,913 B2 | 7/2019 | Franchitti | |
| 10,656,927 B2 | 5/2020 | Hawrylo et al. | |
| 10,877,735 B1 * | 12/2020 | Buck ......................... | G06F 8/20 |
| 2012/0324435 A1 * | 12/2012 | Somani ..................... | G06F 8/30 |
| | | | 717/170 |
| 2019/0266332 A1 | 8/2019 | Quiros Araya et al. | |
| 2020/0183664 A1 * | 6/2020 | Lee ........................... | G06F 8/38 |

* cited by examiner

*Primary Examiner* — Jae U Jeon
(74) *Attorney, Agent, or Firm* — Sterne, Kessler, Goldstein & Fox P.L.L.C.

(57) ABSTRACT

Embodiments disclose systems and methods for generating source code. One or more application specific inputs and one or more external inputs are received. Using a machine learning model, source code is automatically generated based on the one or more application specific inputs and the one or more external inputs. The source code can embody the one or more application specific inputs and the one or more external inputs. One or more revisions to the automatically generated source code may be made, and a difference determined between the generated source code and the revised source code. The machine learning model may be further trained to generate a future source code based on the differences it determines.

20 Claims, 4 Drawing Sheets

AUGMENTED INTELLIGENCE FOR CREATING SOFTWARE DEVELOPMENT ARTIFACTS

TECHNICAL FIELD

Embodiments relate to artificial intelligence systems, specifically artificial intelligence systems for generating source code.

BACKGROUND

When developing software, many rules and constraints have to be adhered to. These rules and constraints include, at least, application specific requirements and corporate rules and/or guidelines for developing software code. These rules and/or guidelines should remain consistent across applications. As a result, source code developed should result in consistent, and oftentimes redundant or highly similar, source code across applications. Current systems and methods for developing software, however, have shortcomings when it comes to allowing software developers to efficiently incorporate redundant or highly similar source code from other applications into their own applications. Often, software developers are not aware that the code they are writing may have been previously written, leading to duplication of efforts. Other times, software developers use different design strategies that result in incompatibility between systems. Systems and methods are needed to address these problems.

SUMMARY

Embodiments disclosed herein provide artificial intelligence systems that perform methods for the generation of source code. The systems and methods improve conventional systems by enabling the automation of source code generation, and as a result increase efficiency when developing software, reduce duplication of efforts, and increase uniformity of source code. In embodiments, the systems can perform methods to receive one or more application specific inputs and one or more external inputs. In embodiments, the systems further automatically generate, with a machine learning model, source code based on the one or more application specific inputs and the one or more external inputs. In embodiments, the source code can embody the one or more application specific inputs and the one or more external inputs. In embodiments, the systems can further receive, by the one or more computing devices, one or more revisions to the source code automatically generated and determine a difference between the source code generated and the source code revised. In embodiments, the systems can further train, by the one or more computing devices, the machine learning model to generate a future source code based on the difference.

Certain embodiments of the invention have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the pertinent art to make and use the disclosure.

DETAILED DESCRIPTION

Figure 1:
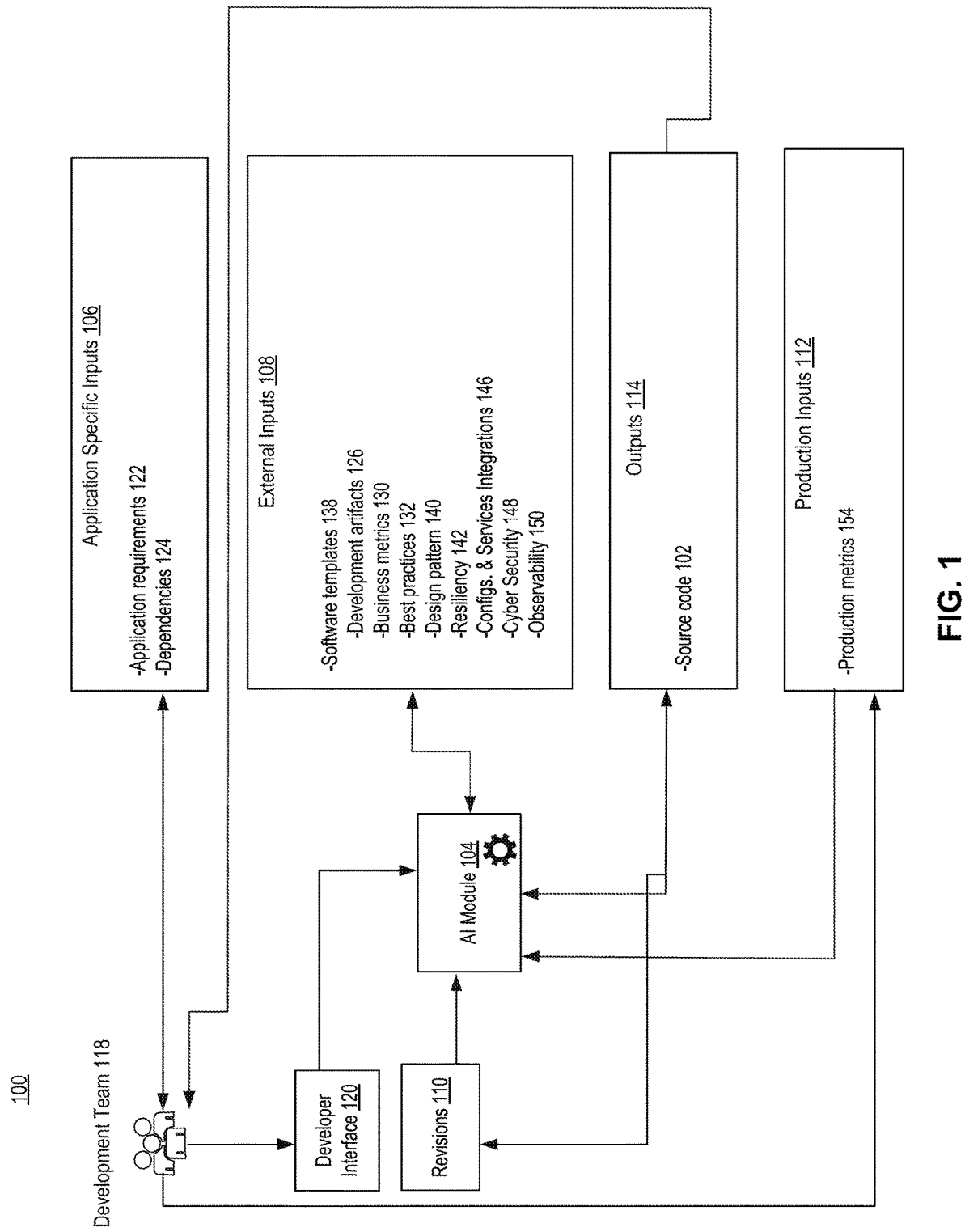
FIG. 1 is a system for automatically generating source code in an embodiment of the present disclosure.

Systems and methods are needed to allow software developers to leverage and develop highly similar source code across applications. Embodiments disclosed herein relate to a system and method that recognize application specific requirements and corporate rules and/or constraints, and based on the same, gain insight as to what source code should be generated. The system and method can further generate source code based on past models in addition to given rules and constraints for a software application, and further generate source code that is redundant across applications. The system and method can also automatically modify the source code for application specific requirements. Current systems lack the ability to perform these functions.

Embodiments disclosed herein can receive, by one or more computing devices, one or more application specific inputs and one or more external inputs. Using a machine learning model, source code is automatically generated based on the one or more application specific inputs and the one or more external inputs. The source code can embody the one or more application specific inputs and the one or more external inputs. One or more revisions to the automatically generated source code are received, and a difference is determined between the generated source code and the revised source code. The machine learning model may further be trained to generate a future source code based on the differences it determines.

The following embodiments are described in sufficient detail to enable those skilled in the art to make and use the disclosure. It is to be understood that other embodiments are evident based on the present disclosure, and that system, process, or mechanical changes may be made without departing from the scope of an embodiment of the present disclosure.

In the following descriptions, numerous specific details are given to provide a thorough understanding of the disclosure. However, it will be apparent that the disclosure may be practiced without these specific details. In order to avoid obscuring an embodiment of the present disclosure, some well-known circuits, system configurations, architectures, and process steps are not disclosed in detail.

The drawings showing embodiments of the system are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the disclosure may be operated in any orientation.

The term "module" or "unit" referred to herein may include software, hardware, or a combination thereof in an embodiment of the present disclosure in accordance with the context in which the term is used. For example, the software may be machine code, firmware, embedded code, or application software. Also for example, the hardware may be circuitry, a processor, a special purpose computer, an integrated circuit, integrated circuit cores or a combination thereof. Further, if a module or unit is written in the system or apparatus claims section below, the module or unit is deemed to include hardware circuitry for the purposes and the scope of the system or apparatus claims.

The modules or units in the following description of the embodiments may be coupled to one another as described or as shown. The coupling may be direct or indirect, without or with intervening items between coupled modules or units. The coupling may be by physical contact or by communication between modules or units.

System Overview and Function

FIG. 1 shows a system 100 for automatically generating source code 102 in an embodiment of the present disclosure. In a variety of embodiments, the system 100 may be part of a backend computing infrastructure, including a server infrastructure of a company or institution. In a variety of embodiments, the system 100 may be used while developing software applications. For example, if a development team 118 (i.e., a group of software developers) is tasked with developing a software application, the system 100 may be used to assist the development team 118 in automatically generating portions of source code 102 for the software application.

In a variety of embodiments, the system 100 may be implemented with modules and sub-modules. For example, the system 100 may include an AI module 104. The AI module 104 can implement a machine learning model used to generate the source code 102 based on one or more inputs. How the machine learning model operates will be described further below. The inputs may include variables, parameters, conditional statements, software templates, or a combination thereof, that together represent the constraints of the software application being developed and the rules of the company or institution for developing the software application.

In a variety of embodiments, the inputs may include application specific inputs 106, external inputs 108, revisions 110, and production inputs 112. Based on the inputs, the AI module 104 can generate one or more outputs 114. The outputs 114 can include at least the source code 102. The source code 102 can embody some or all of the inputs. For example, the source code 102 can embody or implement the rules or constraints of the software application being developed. How the AI module 104 generates the outputs 114 will be discussed further below.

The application specific inputs 106 refer to inputs representing variables, rules, constraints, or other requirements of the software application to be developed. For example, the application specific inputs 106 can include application requirements 122 and dependencies 124. The application requirements 122 refer to application specific features and can include the features and functions that the software application must implement or perform. For example and without limitation, the application requirements 122 can include the descriptions of the specific interfaces the software application must have; the memory allocation and usage requirements for the software application; the classes, methods, or functions the software application must implement or use; safety and security requirements of the software application; what programming languages the software should be implemented in; etc. The dependencies 124 refer to inputs representing what components, systems, or other software or hardware the software application depends on, or must interface with, to perform its functions. For example and without limitation, the dependencies 124 can include descriptions or parameters indicating the hardware components the software application must interface with; what other software applications or application programming interfaces (APIs) the software application must interface with; what external systems the software application must interface with; etc.

Continuing with the example, in a variety of embodiments, the application specific inputs 106 may be obtained from computer readable data files, such as a text file or an extensible markup language (XML) data file, Javascript object notation (JSON), a YML data file, or from a repository or storage location storing the application specific inputs 106. In a variety of embodiments, the application specific inputs 106 may be transmitted to the AI module 104 from the computer readable data file, the repository, or the storage location, for further processing by the AI module 104. In a variety of embodiments, the application specific inputs 106 can further be input directly into the AI module 104 by the development team 118. For example, the development team 118 can input the application specific inputs 106 via a developer interface 120, for example an API or web interface.

The external inputs 108 refer to inputs representing rules, constraints, thresholds, standards, requirements, or a combination thereof required by the company or institution for developing software applications. The external inputs 108 can represent the internal policies, rules, or constraints placed on the development of software applications so that the software applications work with, and conform to, the systems and infrastructure of the company or institution. The external inputs 108 can include a variety of inputs, including, for example and without limitation: development artifacts 126, business metrics 130, best practice parameters 132, design pattern parameters 140, resiliency parameters 142, configuration and services integration parameters 146, cyber security parameters 148, or observability parameters 150.

Development artifacts 126 refer to existing software code or configurations that have been implemented, written, or generated to support existing applications or systems of the company or institution that the software application being developed must be compatible with. For example, the development artifacts 126 can be code and/or configurations that implement security measures or processes that must be integrated into any software application being developed by the company or institution.

Business metrics 130 refer to business constraints (i.e., business rules) that must be adhered to by all software applications developed for the company or institution. For example, if the software application is being developed to facilitate financial transactions, the business metrics 130 can include conditions, thresholds, or parameters indicating, for example, the maximum amount of time in which transactions are to be completed, customer guarantees for the categories of transactions (e.g., no fees charged on transactions below a certain threshold value, etc.), maximum or minimum thresholds that may be transacted on, rules related to certain categories of transactions (e.g., rules related to transfers to foreign countries vs. domestic transfers), etc. The business metrics 130 can also include conditions, thresholds, or parameters indicating baseline business related minimum requirements that the software application must adhere to in order to provide a required performance or user experience for customers, users, or the system overall. For example, business metrics 130 can further include conditions, thresholds, or parameters indicating a minimum or maximum number of users the software application must support, what response times the software application must adhere to, the minimum downtime the software application can have, etc. to provide an adequate user experience and/or perform to company or institution standards and business guarantees to users or customers.

Best practices parameters 132 refer to policies developed by the company or institution that indicate best practices in developing software applications. For example, these can include formatting guidelines for code, naming conventions, file or folder structure guidelines, etc.

Design pattern parameters 140 refer to code specific design patterns or formats that are used by the company or institution when designing software code for applications so the software code can adapt and integrate into the existing company or institution systems and infrastructure. Examples of design pattern parameters 140 include classes, software wrappers, etc. implementing code specific design patterns or formats for software, such as Adapter, Facade, Prototype, Strategy, Abstract, Singleton, Observer, Factory, etc. The aforementioned are examples of design patterns or formats known in the art for developing software, and implement formalized best practices for class structures, API conventions, how classes interface with one another, etc., that a software developer can use to solve common problems when designing an application or system.

Resiliency parameters 142 refer to conditions or rules regarding how the software application is to behave to prevent it from crashing. The resiliency parameters 142 can indicate how the software application is able to auto failover and recover during disaster situations, such as power outages, infrastructure failures, etc., and to what systems the software application is to failover to in order to continue performing its functions.

Configuration and services integration parameters 146 refer to configurations or settings the software must have pre-coded in order for the software application to integrate into existing systems of the company or institution. For example, these can be uniform resource locators (URLs) to repositories, webpages, or databases where the software application can obtain the data it needs to perform its functions, or URLs to locations where the software application can output data it generates.

Cyber security parameters 148 refer to cyber security standards or rules defined by the company or institution that the software application must adhere to. These include rules and limits on resources or sources that the software application can access, what permissions the software application has to access resources, etc.

Observability parameters 150 refer to parameters or metrics indicating the overall status of company or institution systems and infrastructure. The observability parameters 150 can indicate overall system behavior, provide network/event tracing, provide status information regarding CPU, memory utilization, network utilization, disk space usage, etc., provide information on failures or potential failures, and provide application logs of events. The software application can use the observability parameters 150 to obtain feedback regarding the company or institution environment or systems so as to inform some of its own functionality, for example, what functions to trigger in the event of a system failure or degradation.

Continuing with the example, in a variety of embodiments, the external inputs 108 may be integrated into software templates 138 that may be input into the AI module 104. In other words, the software templates 138 can implement the external inputs by, for example, implementing the rules, constraints, variables, or parameters of the external inputs 108 into a pre-written code. The software templates 138 may be used to train the AI module 104 on how to generate the source code 102. The software templates 138 refer to models of pre-written software code. For example, the software templates 138 may include pre-written code implementing certain functions that are commonly used across software applications, and that take into account the requirements and constraints of the external inputs 108. In this way, the corporation or institution policies and requirements regarding software development may be taken into account by the AI module 104 when automatically generating the source code 102.

The software templates 138 may be optimized and tested to ensure their functionality and compatibility with the company or institution backend systems and infrastructure. The functions of the software templates 138 can vary and can include, for example and without limitation, functions related to searching or retrieving data, or functions such as creating certain interfaces or generating certain variables, parameters, or outputs used across software applications, functions related to security policies for software applications, etc.

In a variety of embodiments, the AI module 104 may be trained to copy, modify, or derive pre-written code from the software templates 138, to implement certain functions of the software application being developed. For example, if the software application being developed is required to perform a certain function, for example searching for a certain piece of data, the AI module 104 may be trained to copy, modify, or derive pre-written code from any of the software templates 138 that perform the same function. In a variety of embodiments, this may be done, for example, by training the AI module 104 to search for the software templates 138 based on their functions and copying, modifying, or deriving the pre-written code from the software templates 138 into the future source code generated by the AI module 104. In a variety of embodiments, this may also be done by training the AI module 104 to recognize patterns, using machine learning classifier architectures, for example neural networks, linear classifiers, nearest neighbor, support vector machines, decision trees, boosted trees random forest, etc., to match application specific inputs 106 and/or production inputs 112 to the software templates 138 in order to derive the source code 102.

By way of example, in a variety of embodiments, the AI module 104 can perform a search for the software templates 138 via a table lookup, where pre-existing tables exist that may be used to map the desired function of the software application being developed via the application specific inputs 106, to the software templates 138. The mapping may be performed by matching the application specific inputs 106 to descriptions or parameters indicating what functions the software templates 138 perform. In a variety of embodiments, the descriptions or parameters can be entries in the pre-existing tables. In a variety of embodiments, the pre-existing tables may be pre-generated and may be stored in a storage location or repository for searching. In a variety of embodiments, the AI module 104 can perform the search by comparing the parameters or descriptions associated with the software templates 138 to the application specific inputs 106 to determine if any of the software templates 138 exist that perform the same functions required as indicated by the application specific inputs 106. For example, this can be done by parsing a textual description of the software templates 138, as indicated by the descriptions or parameters, and determining, based on using a natural language processing (NLP) method, what functions the software templates 138 perform. If a software template is found matching the application specific inputs 106, the software template can be used to generate the source code 102.

By way of example, if the application specific inputs 106 require the software application to have a button, where if the button is pressed an email is generated, the AI module 104 can search for software templates 138 implementing such a function. If an exact match is found amongst the software templates 138, the AI module 104 can copy, emulate, or derive the pre-written code from the matching software templates 138 to generate the source code 102.

In a variety of embodiments, if an exact match is not found, the AI module 106 can further be trained to generate a source code 102 highly similar to the desired function. This may be done by, for example, searching for software templates 138 via the table lookup, and searching for the software templates 138 with parameters or descriptions that overlap or partially match with the desired functionality. Take the example where the application specific inputs 106 require the software to have a button, where the button contacts a specific vendor when pressed. In this example, assume no software templates 138 exist with such functionality, but software templates 138 exist for buttons that, when pressed, access databases. In such a scenario, the AI module 104 can copy, emulate, or derive pre-written code from the software templates 138 for buttons that when pressed access databases.

In a variety of embodiments, if the source code 102 generated as the equivalent does not meet the needs of the development team 118, the development team 118 can further modify (i.e., revise) the generated source code 102 to further customize the source code 102 to perform the specific desired function. As used in this disclosure, the modifications will be referred to as revisions 110. The revisions 110 can further be saved to a storage location or repository. The revisions 110 may further be added to the software templates 138 and/or added as new software templates used to train the AI module 104. The new software templates may then be used to generate future source code such that when future software applications are to be developed implementing functions similar to the revised source code, the revised source code can subsequently be used by the AI module 104 to generate a source code 102. The revisions 110 will be discussed further below.

In a variety of embodiments, the AI module 104 can use machine learning classifier architectures to perform its functions. In embodiments, the classifier architectures can be used to recognize patterns in order to match the application specific inputs 106 and/or the production inputs 112 to the software templates 138. Based on the matching, the source code 102 can be derived from the software templates 138. In a variety of embodiments, if for example the machine learning classifier architecture is a neural network, the AI module 104 can implement the neural networks to receive the application specific inputs 106 and/or the production inputs 112, and pass these inputs through successive linear layers. Based on passing the inputs through the successive layers, patterns of specific input sequences can be matched to software templates 138. The software templates 138 can then be returned as the source code 102. Similarly, the same principles can be applied and implemented using other machine learning classifier architectures.

In embodiments, the machine learning classifier architectures can be trained to recognize patterns over a period of time through supervised training methods. In a variety of embodiments, the training methods can train the machine learning classifier architectures to match specific input pattern sequences to specific software templates 138. By way of example, and taking the example where the application specific inputs 106 require the software to have a button and the button contacts a specific vendor when pressed, the application specific inputs 106 for this type of functionality can have a specific pattern. For example, in a variety of embodiments, certain variables, classes, objects, etc. can be defined and passed to the AI module 104, as the application specific inputs 106, indicating that such a functionality is required for the software application being developed. Based on its training, the machine learning classifier architectures of the AI module 104 can receive these inputs and map them to software template 138. For example, in embodiments where the machine learning classifier architectures are neural networks, the AI module 104 can receive these inputs and pass them through successive linear layers, which via various pre-determined weights and biases, can be mapped to software templates 138.

As indicated, the training can be done via supervised training methods. Supervised training methods refer to machine learning tasks where machines can be taught to map an input to an output based on example input-output pairs. In a variety of embodiments, the supervised training can proceed by feeding the machine learning classifier architectures various input patterns of application specific inputs 106 and/or production inputs 112, and attempt to match these input patterns to software templates 138. Based on the how the machine learning classifier architectures match the input patterns to the software templates 138, the machine learning classifier architectures can be given feedback. The feedback can be via the development team 118 (optionally the development team 118 may have their own dedicated machine learning models (e.g., reinforcement, unsupervised, etc.) to evaluate the output and provide the feedback), or other individuals training the machine learning classifier architectures. The feedback can indicate whether the machine learning classifier architectures matched the input patterns to the correct software templates 138. In a variety of embodiments, this process can be performed over a period of time, to train the machine learning classifier architectures to recognize which input patterns match to what software templates 138. In embodiments where the machine learning classifier architectures are neural networks, as a part of the training process, weights and biases connecting the linear layers of the neural network can be tuned based on the feedback. The weights and biases refer to values that provide multipliers for the computations performed by the neural networks to give greater or lesser weight to certain outcomes of computations of the neural network. The tuning of the weights and biases allows the neural networks to better map future input patterns for similar functions to the software templates 138 implementing those functions. Similarly, in embodiments where other machine learning classifier architectures are used, similar weights, biases, or other similar tuning parameters can be used to tune for and/or generate specific outputs.

In embodiments, the tuning can be performed via various methods. For example, in embodiments where the machine learning classifier architectures are neural networks, the tuning can be performed via a cross entropy loss function performed on the output of the neural network to determine the difference between the output of the neural network and the desired outcome (in this case the correct match to the software templates 138). Based on the difference, the weights and biases can be adjusted to better achieve the desired outcome for future inputs. In other embodiments, the tuning can be performed using logistic regression, conditional entropy, maximum likelihood estimation, etc. depending on the machine learning classifier architecture used.

Continuing with the example, in a variety of embodiments, the software templates 138 implementing and incorporating the rules and constraints of the external inputs 108, similar to the application specific inputs 106, may be obtained from a repository or storage location where the software templates 138 are stored. In a variety of embodiments, the software templates 138 may be transmitted to the AI module 104 via the storage location or repository, and may be used for further processing by the AI module 104 and to train the AI module 104.

The production inputs 112 refer to inputs representing rules, constraints, thresholds, requirements, or a combination thereof developed or put in place based on the performance of existing software applications running on a company or institution production environment. The production environment refers to a setting where software applications are put into operation for their intended use by end users, rather than for testing. For example, the production inputs 112 can include at least production metrics 154.

Production metrics 154 refer to variables or parameters used to measure performance of software applications on company or institution backend systems or infrastructure. The production metrics 154 may be used by the AI module 104 to determine constraints of the backend systems and infrastructure, and the limitations of these systems. In a variety of embodiments, based on the production metrics 154, the AI module 104 can generate the source code 102 or future source code, to meet the constraints and limitations of the backend systems and infrastructure. For example and without limitation, the production metrics 154 can include variables or parameters regarding a network utilization by applications, processing resource utilization by applications, network traffic due to applications, error rates due to applications, bugs reported based on applications, uptime for applications, etc.

In a variety of embodiments, the AI module 104 can generate the source code 102 or future source code based on the production metrics 154. Moreover, in a variety of embodiments, the AI module 104 may be trained to learn patterns of the production metrics 154 to determine trends related to the company or institution backend systems. Based on the trends, the AI module 104 can generate the source code 102. For example, in a variety of embodiments, if the trends indicate that network traffic is on a downward trend (i.e., the network has extra capacity for data transfers), the AI module 104 can, for example, generate source code 102 that does not constrain or limit how the software application calls sources of data that it may need as inputs. On the other hand, if the network does not have extra capacity for data transfers, the AI module 104 can, for example, generate source code 102 that limits how many calls a software application makes to sources of data. For example, if there is a choice to obtain data from systems external to company or institution systems and infrastructure or from sources where such data is cached but internal to company or institution systems and infrastructure, the AI module 104 can generate source code 102 to obtain the data from the cached sources so as to limit network traffic from external sources.

In a variety of embodiments, the AI module 104 can utilize the production metrics 154 when automatically generating the source code 102 by modifying any software templates 138 to apply its learning about the company or institution backend infrastructure from the production metrics 154. For example, if software templates 138 are used that have certain variables or parameters that control certain functionality of the company infrastructure, the AI module 104 can adjust the variables or parameters to further optimize and customize the software templates 138 based on the production metrics 154, to provide a more optimized source code 102 for the software application. For example, assume a software application is to be developed that functions to control memory allocation in a server. If the software templates 138 used by the AI module 104 implement such a function, and the production metrics 154 indicate that the backend system has extra memory or storage capabilities, the AI module 104 can generate a source code 102 based on the software templates 138, allowing for use of this extra memory or storage capability. This can be done by modifying, in the software templates 138, any variables or parameters that control this memory allocation functionality. The modified software templates 138 can then be used as the source code 102. In a variety of embodiments, this modified source code 102 may be stored and used to train the AI module 104 for future use when future software applications being developed require the same (or similar) functionality and when the same conditions for the backend systems exist.

Continuing with the example, in a variety of embodiments, the production inputs 112, similar to the application specific inputs 106, may be obtained from computer readable data files, such as a text file or a XML, data file, or from a repository or storage location where the production inputs 112 are stored. In a variety of embodiments, the production inputs 112 can further be transmitted to the AI module 104 via the computer readable data files, the storage location, or the repository, and may be used for further processing by the AI module 104.

As previously mentioned, the revisions 110 refer to modifications made by users of the system 100 to the source code 102 generated by the AI module 104. In a variety of embodiments, the users may be the development team 118. The revisions 110 are made after the AI module 104 generates the source code 102. For example, after the AI module 104 generates the source code 102, the source code 102 may be transmitted to the development team 118. The development team 118 can review the source code 102 and further revise the source code 102 as needed to meet the requirements of the application specific inputs 106. If revisions 110 are made, the software development team 118 can transmit the revised source code back to the AI module 104 so that the revised source code may be analyzed by the AI module 104. This analyzing can include at least the AI module 104 determining a difference between the source code 102 generated and the revised source code. Based on this determination, the AI module 104 can determine, as part of its training, how the revisions 110 have modified the source code 102 originally generated. In a variety of embodiments, the system 100 can store the revised source code 102, similar to what was described above, for future use when application specific inputs 106 for future software applications require the same functionality. As a result, the AI module 104 can generate a memory of revised source code that it can search for via the lookup tables every time the functionalities for software applications are requested via application specific inputs 106. In a variety of embodiments, rather than having the development team 118 transmit the modified source code 102 with the revisions 110 to the AI module 104, the AI module 104 can monitor the changes made by the development team 118 automatically to determine the revisions 110 by implementing a monitoring function that logs keystrokes of the development team 118 to recognize the revisions 110 made.

Figure 2:
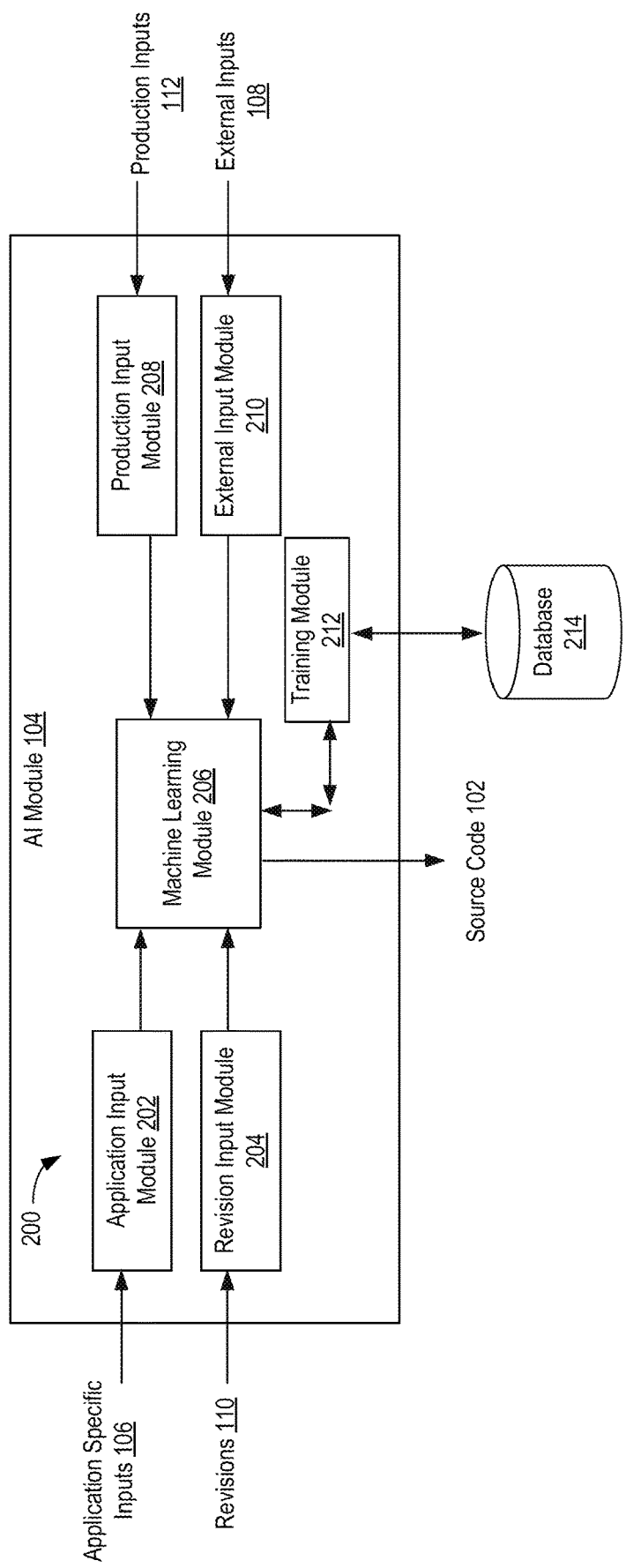
FIG. 2 is an example control flow of an AI module in an embodiment of the present disclosure.

FIG. 2 shows an example control flow 200 of the AI module 104 in accordance with a number of embodiments of the present disclosure. In a variety of embodiments, the control flow 200 may be implemented by modules and sub-modules. For example, the AI module 104 may include an application input module 202, a revision input module 204, a machine learning module 206, a production input module 208, an external input module 210, and a training module 212. In a variety of embodiments, the machine learning module 206 can couple to the application input module 202, the revision input module 204, the production input module 208, the external input module 210, and the training module 212.

In a variety of embodiments, the machine learning module 206 can implement the machine learning model that performs the processes described above with respect to AI module 104 of FIG. 1. For example, the machine learning module 206 can implement the table lookup functions to search for and match the software templates 138 to the application specific inputs 106. In a variety of embodiments, the searching may be done on a database 214 storing the software templates 138. The machine learning module 206 can further generate the source code 102 based on the table lookup and/or perform the modifications to the software templates 138 based on the inputs, for example the production inputs 112, as described with respect to FIG. 1.

In a variety of embodiments, the machine learning module 206 can receive inputs from the application input module 202, the revision input module 204, the production input module 208, and the external input module 210, each of which can serve as interfaces for receiving the application specific inputs 106, the revisions 110, the production inputs 112, and the external inputs 108.

In a variety of embodiments, the training module 212 can couple to the machine learning module 206 and, either by itself or in conjunction with the machine learning module 206, enable the training or learning capabilities of the machine learning model. For example, the training module 212 can enable the determining of the difference between the source code 102 generated by the machine learning module 206 and the revised source code provided by the development team 118, as described with respect to FIG. 1. For example, in a variety of embodiments, the training module 212 can receive the source code 102 generated by the machine learning module 206 and further receive the revisions 110 via the machine learning module 206, the revision input module 204, or a combination thereof. Based on the receipt, the training module 212 can implement the functions necessary to determine the difference between the source code 102 and the revisions 110. For example, it can do a compare function between the two source codes and determine the differences. The training module 212 can further store the differences along with the application specific inputs 106 for the software application in a database 214, in the same way as was described with respect to FIG. 1, for future use and search by the machine learning module 206 when automatically generating source code 102 for future software applications.

The modules described in FIGS. 1-2 may be implemented as instructions stored on a non-transitory computer readable medium to be executed by one or more computing units such as a processor, a special purpose computer, an integrated circuit, integrated circuit cores, or a combination thereof. The non-transitory computer readable medium may be implemented with any number of memory units, such as a volatile memory, a nonvolatile memory, an internal memory, an external memory, or a combination thereof. The non-transitory computer readable medium may be integrated as a part of the system 100 or installed as a removable portion of the system 100.

It has been discovered that the processes and system 100 described above significantly improve the state of the art from previous systems because it introduces a novel way to generate source code 102 based on various inputs including at least application specific inputs 106, revisions 110, production inputs 112, and external inputs 108 to account for the various constraints and requirements on a software application being developed. It has been further discovered that the system 100 significantly improves the art because it saves development time in developing software applications because it generates source code 102 that would otherwise have to be written from scratch each time a software application is to be developed.

It has been further discovered that the system 100 significantly improves the art by automatically generating highly efficient and quality source code 102 by leveraging machine learning techniques that use feedback, such as the revisions 110, to learn how source code 102 must be modified for future use to fit the specific needs of software applications. It has been further discovered that the system 100 significantly improves the art because it allows the consideration and use of production inputs 112 to obtain valuable insights as to how existing software applications perform in a production environment, and adjusts source code 102 to be optimized to the production environment.

It has been further discovered that the system 100 significantly improves the art because by considering the revisions 110, it can reduce the learning time of the machine learning model, because rather than guessing how the source code 102 should be generated, the system 100 can obtain the correct source code via the revisions 110 and learn from the revised code how to generate source code 102 for future software applications. It has been further discovered that the system 100 significantly improves the art by allowing source code 102 to be generated that is consistent with the rules and standards of a company or institution and significantly improves the uniformity of code across the organization through the use of software templates 138.

Methods of Operation

Figure 3:
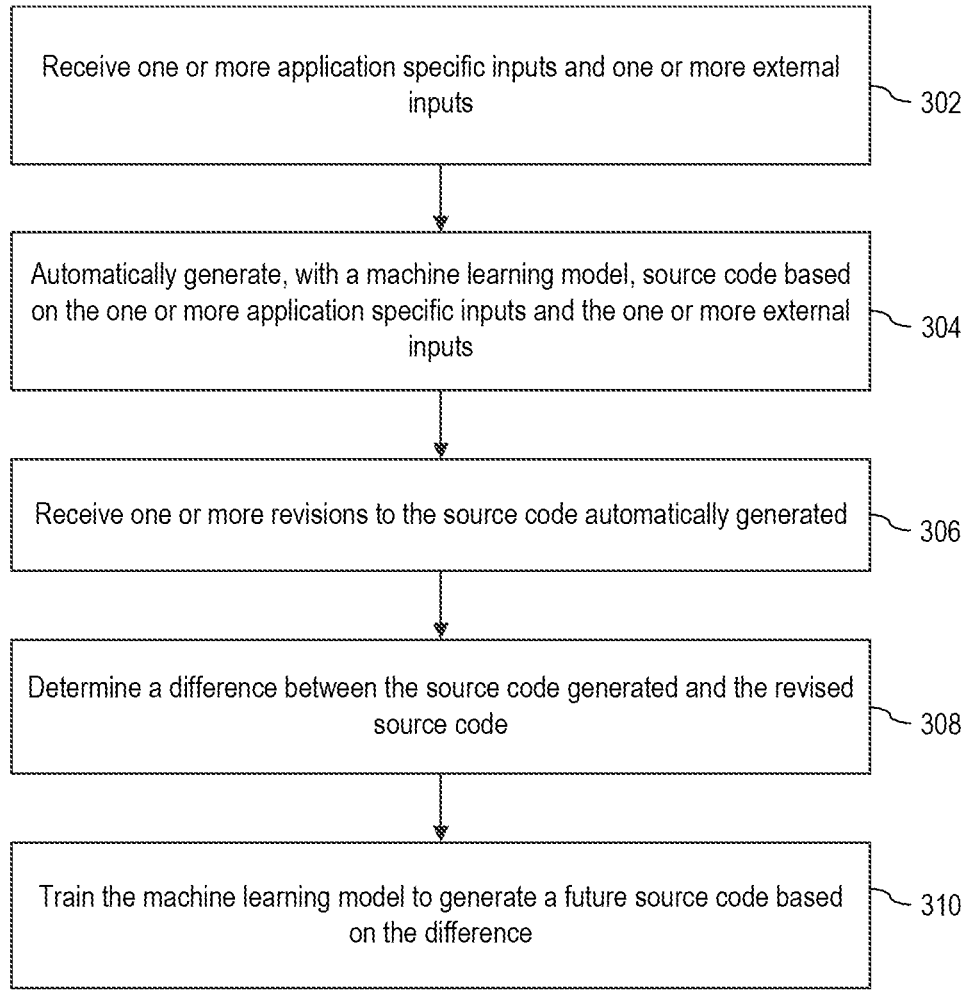
FIG. 3 is an example method of operating the system in an embodiment of the present disclosure.

FIG. 3 shows an example method 300 of operating the system 100 in accordance with a variety of embodiments of the present disclosure. The method 300 receives one or more application specific inputs 106 and one or more external inputs 108, as shown in 302. For example, the one or more application specific inputs 106 and the one or more external inputs 108 can be received by the application input module 202 and the external input module 210. Method 300 can further automatically generate, with a machine learning model, source code 102 based on the one or more application specific inputs 106 and the one or more external inputs 108, wherein the source code 102 embodies the one or more application specific inputs 106 and the one or more external inputs 108, as shown in 304. For example, the machine learning module 206 can implement the machine learning model and automatically generate the source code 102. Method 300 can further receive, by the one or more computing devices, one or more revisions 110 to the source code 102 automatically generated, as shown in 306. For example, the one or more revisions 110 can be received by the revision input module 204. Method 300 further determines, by the one or more computing devices, a difference between the source code 102 generated and the source code 102 revised, as shown in 308. For example, the difference can be determined by the training module 212. Method 300 further trains, by the one or more computing devices, the machine learning model to generate a future source code based on the difference, as shown in 310. For example, training can be done by the training module 212.

The operations of method 300 are performed, for example, by system 100, in accordance with embodiments described above.

Components of the System

Figure 4:
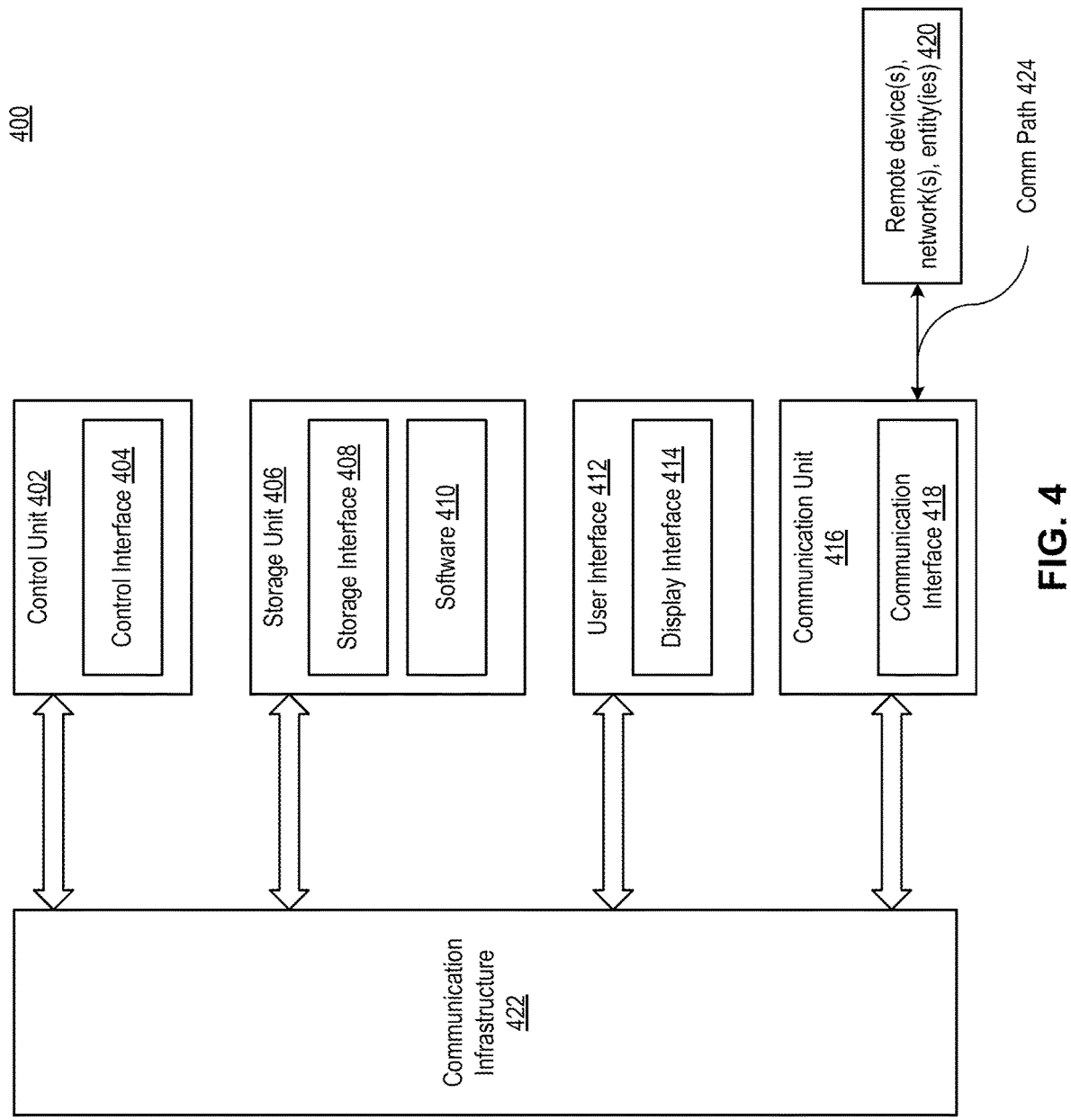
FIG. 4 is an example architecture of the components implementing the system in an embodiment of the present disclosure.

FIG. 4 shows an example architecture 400 of the components implementing the system 100 in a variety of embodiments of the present disclosure. In a variety of embodiments, the components may include a control unit 402, a storage unit 406, a communication unit 416, and a user interface 412. The control unit 402 may include a control interface 404. The control unit 402 may execute a software 410 to provide some or all of the intelligence of the system 100. The control unit 402 may be implemented in a number of different ways. For example, the control unit 402 may be a processor, an application specific integrated circuit (ASIC), an embedded processor, a microprocessor, a hardware control logic, a hardware finite state machine (FSM), a digital signal processor (DSP), a field programmable gate array (FPGA), or a combination thereof.

The control interface 404 may be used for communication between the control unit 402 and other functional units or devices of the system 100. The control interface 404 may also be used for communication that is external to the functional units or devices of the system 100. The control interface 404 may receive information from the functional units or devices of the system 100, or from remote devices 420, or may transmit information to the functional units or devices of the system 100 or to remote devices 420. The remote devices 420 refer to units or devices external to the system 100.

The control interface 404 may be implemented in different ways and may include different implementations depending on which functional units or devices of the system 100 or remote devices 420 are being interfaced with the control unit 402. For example, the control interface 404 may be implemented with a pressure sensor, an inertial sensor, a microelectromechanical system (MEMS), optical circuitry, waveguides, wireless circuitry, wireline circuitry to attach to a bus, an application programming interface, or a combination thereof. The control interface 404 may be connected to a communication infrastructure 422, such as a bus, to interface with the functional units or devices of the system 100 or remote devices 420.

The storage unit 406 may store the software 410. For illustrative purposes, the storage unit 406 is shown as a single element, although it is understood that the storage unit 406 may be a distribution of storage elements. Also for illustrative purposes, the storage unit 406 is shown as a single hierarchy storage system, although it is understood that the storage unit 406 may be in a different configuration. For example, the storage unit 406 may be formed with different storage technologies forming a memory hierarchical system including different levels of caching, main memory, rotating media, or off-line storage. The storage unit 406 may be a volatile memory, a nonvolatile memory, an internal memory, an external memory, or a combination thereof. For example, the storage unit 406 may be a nonvolatile storage such as nonvolatile random access memory (NVRAM), Flash memory, disk storage, or a volatile storage such as static random access memory (SRAM) or dynamic random access memory (DRAM). The database 214 may be implemented with the same technologies as the storage unit 406.

The storage unit 406 may include a storage interface 408. The storage interface 408 may be used for communication between the storage unit 406 and other functional units or devices of the system 100. The storage interface 408 may also be used for communication that is external to the system 100. The storage interface 408 may receive information from the other functional units or devices of the system 100 or from remote devices 420, or may transmit information to the other functional units or devices of the system 100 or to remote devices 420. The storage interface 408 may include different implementations depending on which functional units or devices of the system 100 or remote devices 420 are being interfaced with the storage unit 406. The storage interface 408 may be implemented with technologies and techniques similar to the implementation of the control interface 404.

The communication unit 416 may enable communication to devices, components, modules, or units of the system 100 or to remote devices 420. For example, the communication unit 416 may permit the system 100 to communicate with the development team 118, or to transmit data to and from the various modules of the system 100. The communication unit 416 may further permit the devices of the system 100 to communicate with remote devices 420 such as an attachment, a peripheral device, or a combination thereof through a communication path 424, such as a wireless or wired network.

The communication path 424 may span and represent a variety of networks and network topologies. For example, the communication path 424 may be a part of a wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the communication path 424. Cable, Ethernet, digital subscriber line (DSL), fiber optic lines, fiber to the home (FTTH), and plain old telephone service (POTS) are examples of wired communication that may be included in the communication path 424. Further, the communication path 424 may traverse a number of network topologies and distances. For example, the communication path 424 may include direct connection, personal area network (PAN), local area network (LAN), metropolitan area network (MAN), wide area network (WAN), or a combination thereof.

The communication unit 416 may also function as a communication hub allowing the system 100 to function as part of the communication path 424 and not be limited to be an end point or terminal unit to the communication path 424. The communication unit 416 may include active and passive components, such as microelectronics or an antenna, for interaction with the communication path 424.

The communication unit 416 may include a communication interface 418. The communication interface 418 may be used for communication between the communication unit 416 and other functional units or devices of the system 100 or to remote devices 420. The communication interface 418 may receive information from the other functional units or devices of the system 100, or from remote devices 420, or may transmit information to the other functional units or devices of the system 100 or to remote devices 420. The communication interface 418 may include different implementations depending on which functional units or devices are being interfaced with the communication unit 416. The communication interface 418 may be implemented with technologies and techniques similar to the implementation of the control interface 404.

The user interface 412 may present information generated by the system 100. In a variety of embodiments, the user interface 412 allows a user of the system 100 to interface with the devices of the system 100 or remote devices 420. The user interface 412 may include an input device and an output device. Examples of the input device of the user interface 412 may include a keypad, buttons, switches, touchpads, soft-keys, a keyboard, a mouse, or any combination thereof to provide data and communication inputs. Examples of the output device may include a display interface 414. The control unit 402 may operate the user interface 412 to present information generated by the system 100. The control unit 402 may also execute the software 410 to present information generated by the system 100, or to control other functional units of the system 100. The display interface 414 may be any graphical user interface such as a display, a projector, a video screen, or any combination thereof.

The above detailed description and embodiments of the disclosed system 100 are not intended to be exhaustive or to limit the disclosed system 100 to the precise form disclosed above. While specific examples for the system 100 are described above for illustrative purposes, various equivalent modifications are possible within the scope of the disclosed system 100, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel and/or may be performed at different times.

The resulting methods, process, apparatus, device, product, and system 100 is cost-effective, highly versatile, and accurate, and may be implemented by adapting components for ready, efficient, and economical manufacturing, application, and utilization. Another important aspect of the present disclosure is that it valuably supports and services the historical trend of reducing costs, simplifying systems, and increasing performance.

These and other valuable aspects of the embodiments of the present disclosure consequently further the state of the technology to at least the next level. While the disclosed embodiments have been described as the best mode of implementing the system 100, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense. Accordingly, the scope of the invention should be determined not by the embodiments illustrated, but by the appended claims and their equivalents.

What is claimed is:

1. A computer implemented method for generating source code, the method comprising:
    (a) receiving, by one or more computing devices, one or more application specific inputs and one or more external inputs;
    (b) automatically generating, with a machine learning model, the source code based on the one or more application specific inputs and the one or more external inputs, wherein the source code embodies the one or more application specific inputs and the one or more external inputs;
    (c) receiving, by the one or more computing devices, one or more revisions to the source code automatically generated in (b);
    (d) determining, by the one or more computing devices, a difference between the source code generated in (b) and the source code revised in (c); and
    (e) training, by the one or more computing devices, the machine learning model to generate a future source code based on the difference in (d).

2. The method of claim 1, wherein automatically generating the source code in (b) comprises:
    matching one or more software templates implementing the external inputs to the application specific inputs via a table lookup,
    wherein the source code generated in (b) is derived from the one or more software templates matching the application specific inputs.

3. The method of claim 1, further comprising:
    receiving, by the one or more computing devices, one or more production metrics; and
    based on the one or more production metrics, training, by the one or more computing devices, the machine learning model to generate the future source code.

4. The method of claim 3, wherein the production metrics represent trends of a backend computing infrastructure.

5. The method of claim 1, further comprising:
    receiving, by the one or more computing devices, one or more production metrics; and
    based on the one or more production metrics, generating the source code in (b).

6. The method of claim 1, further comprising:
    transmitting, by the one or more computing devices, the source code generated in (b) to a user; and
    receiving, by the one or more computing devices, the one or more revisions to the source code in (c) from the user.

7. The method of claim 1, further comprising
    storing, by the one or more computing devices, the source code revised in (c) in a database; and
    generating, with the machine learning model, the future source code based on the stored source code revised in (c).

8. A non-transitory computer readable medium including instructions for a computing system for generating source code, the instructions comprising:
    (a) receiving, by one or more computing devices, one or more application specific inputs and one or more external inputs;
    (b) automatically generating, with a machine learning model, the source code based on the one or more application specific inputs and the one or more external inputs, wherein the source code embodies the one or more application specific inputs and the one or more external inputs;

(c) receiving, by the one or more computing devices, one or more revisions to the source code automatically generated in (b);

(d) determining, by the one or more computing devices, a difference between the source code generated in (b) and the source code revised in (c); and (e) training, by the one or more computing devices, the machine learning model to generate a future source code based on the difference in (d).

9. The non-transitory computer readable medium of claim 8, with instructions wherein automatically generating the source code in (b) comprises:

matching one or more software templates implementing the external inputs to the application specific inputs via a table lookup, wherein the source code generated in (b) is derived from the one or more software templates matching the application specific inputs.

10. The non-transitory computer readable medium of claim 8, with instructions further comprising:

receiving, by the one or more computing devices, one or more production metrics; and based on the one or more production metrics, training, by the one or more computing devices, the machine learning model to generate the future source code.

11. The non-transitory computer readable medium of claim 10, wherein the production metrics represent trends of a backend computing infrastructure.

12. The non-transitory computer readable medium of claim 8, with instructions further comprising:

receiving, by the one or more computing devices, one or more production metrics; and based on the one or more production metrics, generating the source code in (b).

13. The non-transitory computer readable medium of claim 8, with instructions further comprising:

transmitting, by the one or more computing devices, the source code generated in (b) to a user; and receiving, by the one or more computing devices, the one or more revisions to the source code in (c) from the user.

14. The non-transitory computer readable medium of claim 8, with instructions further comprising:

storing, by the one or more computing devices, the source code revised in (c) in a database; and generating, with the machine learning model, the future source code based on the stored source code revised in (c).

15. A computing system for generating source code comprising:

a communication unit configured to (a) receive one or more application specific inputs and one or more external inputs; and a control unit, coupled to the communication unit, configured to:

(b) automatically generate, with a machine learning model, the source code based on the one or more application specific inputs and the one or more external inputs, wherein the source code embodies the one or more application specific inputs and the one or more external inputs, (c) determine a difference between the source code generated in (b) and one or more revisions received for the source code, (d) train the machine learning model to generate a future source code based on the difference in (c); and wherein the communication unit is further configured to (e) receive the one or more revisions for the source code.

16. The computing system of claim 15, wherein the control unit is further configured to automatically generate the source code in (b) comprises:

matching one or more software templates implementing the external inputs to the application specific inputs via a table lookup, wherein the source code generated in (b) is derived from the one or more software templates matching the application specific inputs.

17. The computing system of claim 15, wherein:

the communication unit is further configured to receive one or more production metrics; and the control unit is further configured to train the machine learning model to generate the future source code based on the one or more production metrics.

18. The computing system of claim 15, wherein:

the communication unit is further configured to receive one or more production metrics; and the control unit is further configured to generate the source code in (b) based on the one or more production metrics.

19. The computing system of claim 15 wherein the communication unit is further configured to:

transmit the source code generated in (b) to a user; and receive the one or more revisions to the source code in (c) from the user.

20. The computing system of claim 15 wherein:

the communication unit is further configured to transmit for storage the source code revised in (c) in a database; and the control unit is further configured to generate, with the machine learning model, the future source code based on the stored source code revised in (c).

* * * * *